April 23, 1935.　　　H. A. DREFFEIN　　　1,999,038
METHOD AND APPARATUS FOR CONTROLLING FURNACES
Filed July 2, 1931
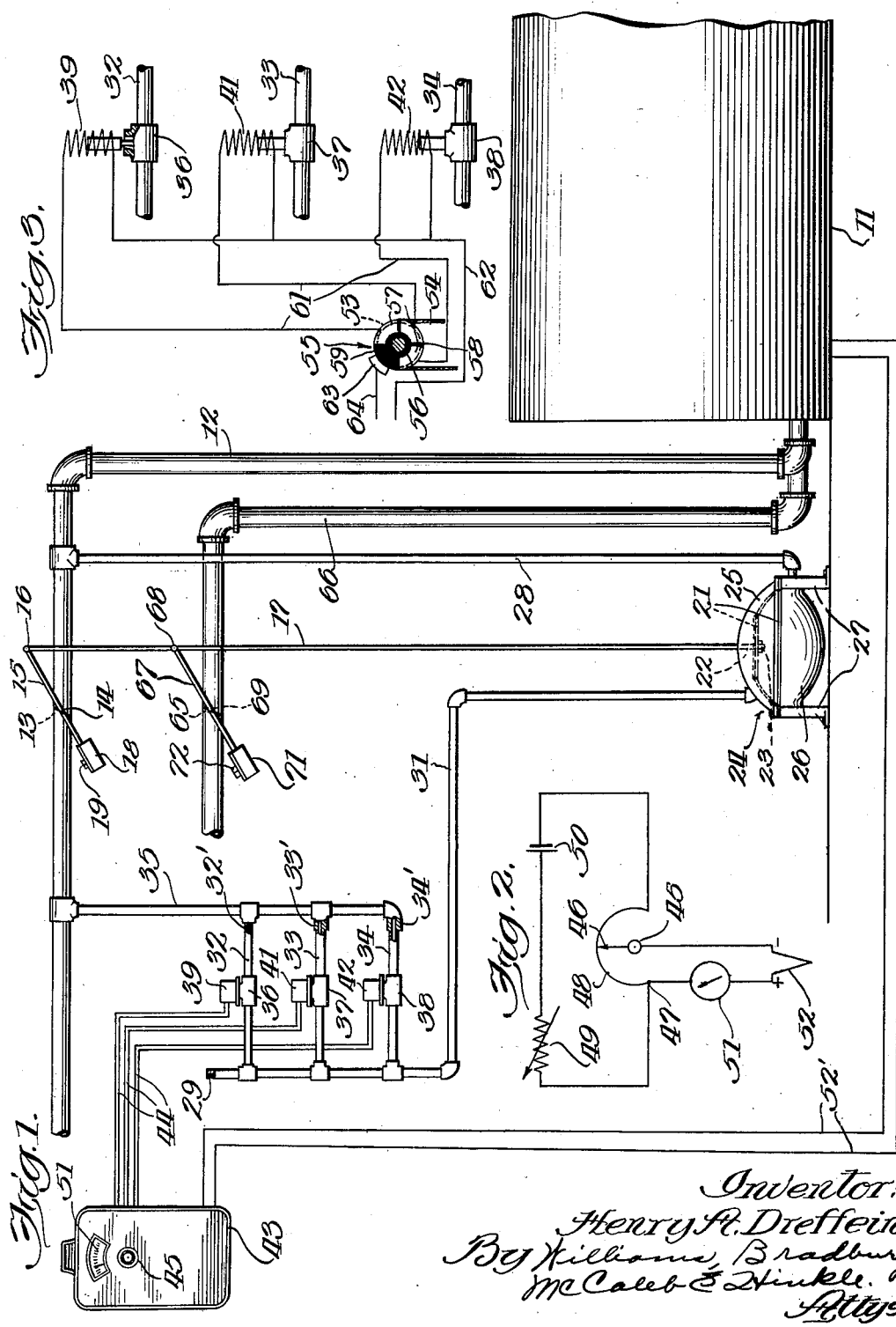

Patented Apr. 23, 1935

1,999,038

UNITED STATES PATENT OFFICE 1,999,038

METHOD AND APPARATUS FOR CONTROLLING FURNACES

Henry A. Dreffein, Chicago, Ill.

Application July 2, 1931, Serial No. 548,467

4 Claims. (Cl. 236—15)

This invention relates in general to furnaces and has more particular reference to a novel method and apparatus for controlling the heat conditions of a furnace.

An object of the present invention is the provision of an improved regulating and control apparatus which will be readily adapted to control the temperature of a furnace automatically.

Another object of the invention is the provision of a novel method and means of controlling the fuel supply of a furnace responsive to temperature variations of the furnace.

A further object of the instant invention is the provision of electro-magnetic means for controlling the fuel and/or air supply of a furnace responsive to variations in temperature within the furnace.

Another important object of the invention is to provide a multi-point fuel supply control responsive to a differential of pressures at different locations in the fuel supply line.

Numerous other objects and advantages of the invention will be apparent as it is better understood from the following description, which taken in connection with the accompanying drawing discloses an embodiment thereof.

In the drawing:

Fig. 1 is a fragmentary diagrammatic view of a furnace embodying the features of my invention;

Fig. 2 is a schematic wiring diagram illustrative of the temperature indicating device employed in Fig. 1; and Fig. 3 is a schematic wiring diagram illustrating the operation of a feature of the invention.

In the operation of furnaces, particularly wherein the heat treatment of metals, alloys, and ores is involved, an accurate, simple, and positive control of the furnace heat conditions is important. Frequently, it is of utmost importance to keep the temperature within the furnace substantially constant for certain processes or treatments. For effectively maintaining such substantially constant temperatures, sensitive yet positive automatic regulation of the temperature, in contradistinction with manual regulation directed by a supervising signal system actuated by a temperature observer or indicator, is almost indispensable and is most accurate and precise.

In the practice of the instant invention I provide a positive, precise and effective furnace control and regulator which is automatically responsive to the furnace temperature and which controls and regulates the rate at which fuel and/or air is supplied to the furnace by means of a fuel and/or air control device responsive to a differential of pressure at different places within the furnace supply or feed conduit. Such a furnace control apparatus is capable of fine regulatory or adjustment features thereby serving as a multi-point control which is simple and positive in operation.

In order to accomplish the foregoing objects a furnace 11, diagrammatically illustrated in Fig. 1 is adapted to be supplied with fuel and/or air under pressure by means of a supply conduit, pipe, or inlet 12 communicating with the furnace and connectible to any suitable source of supply, not shown. The pipe or inlet 12 is provided with a control means or valve 13 for controlling the rate at which air or fuel is supplied to the furnace whereby the furnace temperature may be controlled and regulated.

This valve 13 may be of any suitable construction which in its closed position does not entirely prevent the fuel or air from being supplied to the furnace 11. As shown a valve of the common butterfly type, which is never quite closed, is employed and is pivotally supported within the pipe 12. A valve stem or arm 14 extends outside of the pipe 12 for connection to a valve operating lever 15 which is pivotally connected as at 16 to a valve actuating lever 17 for operating the valve and controlling the feeding rate within the pipe 12 to the furnace 11.

The valve operating lever 15 at the end opposite the pivot connection 16 is suitably counterbalanced against the action of the actuating lever 17. The counterbalancing may be effected by a spring or, as illustrated by a weight 18 slidably attached to the lever 15 by a retaining adjustment screw 19, the weight 18 tending to close the valve.

Any pressure responsive movable or reciprocable member 21 such, for example, as a diaphragm is adjustably secured to the end of the actuating lever 17 opposite the pivot 16 by means of a threaded portion 22 of the lever and a nut 23. This member 21 operates the valve 13, responsive to pressures at opposite sides of the valve, and the adjustable connection between the lever 17 and the diaphragm provides for adjusting the valve throw. The movable member or diaphragm 21 divides a casing or housing 24 into an upper chamber 25 and a lower chamber 26. The housing or casing may be supported on suitable supports or legs 27.

The lower chamber 26 communicates with the feed pipe 12 through a pipe or connections 28 connected thereto at the furnace or low pressure side of the valve 13. In other words the fuel or air substantially at the furnace pressure acts against the bottom of the movable member 21 tending to raise or extend the diaphragm and thereby raise the actuating lever 17 to reduce the rate at which the air or fuel is supplied to the furnace by substantially closing the valve 13. This reduces the pressure at the furnace side of the valve and hence the pressure in the chamber 26 and thereby tends to reduce the closing force at the valve.

The upper chamber 25 communicates with the atmosphere or outside through a restricted opening or leak 29 in a pipe or connections 31 or the chamber 25 may communicate with the pipe 12 at the high pressure or pressure source side of the valve 13 through pipes or connections 32, 33, 34, and 35. These connections permit me to employ the supply source pressure at a plurality of suitable values in the upper chamber 25 to create a differential of pressure in the housing 24 and force the member or diaphragm 21 down against the pressure in the chamber 26, opening the valve 13 an amount corresponding to the differential of pressure. The bleed or leak opening 29 will of course eliminate the quick return of the member or diaphragm 21, and the shock consequent thereupon, when the greater pressure is not maintained in the chamber 25 by means of the connections 32 to 35. This slow return of the member 21 provides a slow but positive closing action for the valve 13, which tends to reduce the rate of fuel supply, not abruptly but in accordance with the desired change in furnace temperature.

In this manner the supply of air or fuel to the furnace 11 may be increased and the furnace will continue to receive air or fuel at this open position of the valve 13 until the pressure in the chamber 25 acting with the diaphragm 21 is diminished to a value below that of the pressure in the lower chamber 26. When such a condition obtains the movable member or diaphragm 21 is moved or forced to its extended position by virtue of the differential of pressure at the opposite sides of the diaphragm until the valve 13, assisted by the counterbalance 18, assumes the position shown in Fig. 1. This is the normal position. It will be observed that the valve 13 is not quite closed, but that fuel or air may in this normally closed position be supplied through the conduit 12 to the furnace 11.

In order to regulate and control the pressure in the upper chamber 25 of the diaphragm housing 23 I provide control means or valves 36, 37 and 38 in the pipes 32, 33 and 34, respectively, provided with orifices 32', 33', and 34' of suitable sizes. These control valves are electromagnetically operated by solenoids or coils 39, 41 and 42 controlled by pyrometric means 43 connected thereto by leads or conductors 44. The means 43 is a temperature measuring device for the furnace 11.

While the pyrometric means 43 may be any suitable temperature meter and per se forms no part of the present invention, it might be well to point out at this point that such devices usually operate upon the potentiometer principle as diagrammatically illustrated in Fig. 2.

As shown, a setting member or knob 45 operates a movable contact 46 which varies the potential drop between the movable contact 46 and an end or point 47 of a resistor or slide wire 48 forming the contact complementary to the movable contact 46. This movable or slidable contact varies the potential supplied to an external or branch circuit from the circuit including the slide wire 48, a rheostat 49, and a source 50 of electrical energy. The external circuit includes a galvanometer 51 and a thermocouple 52, the latter being connected in the external circuit in such a manner as to oppose the potential supplied from the circuit including the side wire and contact 46. When the thermocouple 52 is heated as in the furnace 11, it will supply a current through conductors or wires 52' to the galvanometer 51 in a direction opposite to that supplied by virtue of the slidable contact and when these two currents are equal the galvanometer will show no deflection. If, therefore, the slide wire 48 be calibrated in degrees the movable or slidable contact 46 may be set to the temperature desired in the furnace and when this temperature is reached the galvanometer will show no deflection. If the temperature is exceeded the galvanometer will deflect to one side and if the temperature is less than that set by the member 45 the galvanometer will show a deflection to the opposite side.

The above described pyrometric means is a well known instrument, including a mechanism schematically illustrated in Fig. 3 as a pulley 53 and belt 54 driven by a motor or otherwise responsive to the variations of the galvanometer or the temperature in the furnace. This mechanism is usually employed for recording or making a chart of the temperature conditions indicated by the instrument. In the practice of my invention, however, I employ this driven mechanism to actuate a commutating or contact device 55 on a shaft 56 suitably coupled to such driven recording mechanism as, for example, by the shaft 56. The device 55 may be of any suitable construction, such as that illustrated schematically in Fig. 3 for controlling the operation of the valves 36, 37, and 38 in the desired sequence or combinations.

Such a commutator may have, by way of example, conducting segments 57 insulated from each other and the shaft 54 by insulation 58 and a nonconducting segment 59. The conducting segments 57 of the commutator or contact member 55 are connected by wires or conductors 61 to the coils 39, 41 and 42, the other sides of these coils being connected by means of a wire or conductor 62 to a suitable source of energy, not shown. The other side of the source of energy may be connected to a brush or contact member 63 by means of a wire or conductor 64, so that when the temperature in the furnace varies, the fluctuation of the recording mechanism actuates the commutator and causes the brush 63 to contact with the segments 57 and 59. When the brush contacts with the segment 59 the valves 36, 37 and 38 are closed and the valve 13 substantially closed. In order to supply more fuel or air through the conduit 12 to the furnace 11 so that the temperature in the furnace will approach the indicated temperature, the brush 63 contacts with the conducting segments 57 in the desired sequence or combinations whereupon the solenoids are energized and deenergized and the valves 36 to 38 operated thereby supplying fuel or air to the chamber 25 to open the valve 13 the amount required to supply the fuel or air at a sufficient rate to increase the furnace temperature to the desired temperature.

The valve 13 may be adjusted to a plurality of open positions responsive to the furnace temperature upon the rotation of the commutator by the driving mechanism or pulley 53 and belt 54, the valve 13 operating slowly so that the fuel or air supply to the furnace will not be rapidly changed and the consequent temperature changes will not lag too far behind these supply changes.

For example, the brush, upon rotation of the commutator from the position shown, may contact first with the segment 57 to energize the coil 39 and admit air or fuel to the chamber 25 through the orifice 32′ at a pressure determined by the relative sizes of the orifice 32′ and the leak 29. In like manner the coils 41 and 42 and the corresponding orifices 33′ and 34′ may cause a variation of pressure in the chamber 25. The brush 63 may of course be so constructed as to bridge between adjacent segments 57 so that coils 39 and 41 and coils 41 and 42 with the corresponding orifices may be operative at the same time as valve operating conditions between the conditions when coil 39 and the coil 41 and the conditions when the coil 41 and the coil 42 are energized.

Thus it will be seen that by the particular combination of valves 36 to 38 and orifices 32′ to 34′ illustrated in Figs. 1 and 3, I am enabled to obtain a multi-point or six point furnace control, that is, valve 36 open, valves 36 and 37 open, valve 37 open, valves 37 and 38 open, valve 38 open and no valves open. By selecting valves of the desired characteristics and orifices of various sizes, I can accurately control the pressure in the upper chamber 25 whereby to control the operation of the valve 13 determining the fuel or air supply to the furnace 11.

Where desirable the actuating lever 17 may also actuate a valve 65 in a feed pipe or conduit 66 communicating at one end with the furnace 11 and at its opposite end with a source of fuel or air, not shown, by means of a valve operating lever 67 pivoted as at 68 to the lever 17 intermediate its ends and operatively connected as at 69 to the valve 65.

The valve operating lever 67 like the lever 15 may be counterbalanced by a spring or as shown, a counterbalancing weight 71 movably fixed at its end opposite the pivot 68 by means of a retaining bolt 72, whereby to adjust the weight on the operating lever and counterbalance the other end of the valve operating lever.

By means of the valves 13 and 65 I can control the fuel and air supply to the furnace and can adjust the supply of each by means of the multipoint control already described, so that the fuel and air supplied to the furnace 11 at each of the above mentioned valve positions may be efficiently utilized in the furnace to provide the desired temperature conditions so that the various valve positions provide positive control positions in the furnace.

It will of course be understood that the invention is not limited to the specific embodiment herein disclosed and described, but is susceptible to many changes in the details of construction.

Having thus described my invention, what I claim and desire to secure by United States Letters Patent is:

1. In a furnace, a fuel conduit adapted to conduct fuel under pressure to the furnace, a pressure operated valve in said fuel conduit responsive to the pressure differential at opposite sides of said valve, a plurality of electromagnetic valves connected to said fuel conduit ahead of said pressure operated valve and controlling the pressure differential thereof and pyrometric means selectively controlling said electromagnetic valves, providing a multi-point control for said pressure operated valve whereby to adjust the rate of fuel supply to said furnace.

2. In a furnace having a fuel conduit for supplying fuel under pressure to the furnace, a valve in said conduit causing a differential of pressure at opposite sides of said valve, a reciprocable member operatively connected to said valve, said fuel conduit at the furnace side of said valve communicating with one side of said reciprocable member whereby said member tends to close said valve, pressure supply connections between the other side of said member and the supply side of said valve for opposing the valve closing action of said reciprocable member, and a plurality of controlled valves controlling said pressure supply connections.

3. A furnace control apparatus comprising adjacent air chambers, a pressure responsive movable valve operating member therebetween, a common source of air supply for supplying air to said chambers to operate said pressure responsive movable member, a furnace control valve in said source of air supply between said chambers, said valve being operably connected to said movable member, a plurality of selectively operable valves controlling the supply of air to a said chamber, and heat responsive means for selectively operating said valves whereby said furnace control valve is operated in accordance with the furnace heat conditions.

4. A furnace having a fuel supply pipe for supplying fuel under pressure to the furnace in combination with a non-closable fuel control valve in said pipe, pressure actuated valve operating means connected to said valve, connecting means between said pressure actuated valve operating means and said pipe including a plurality of orifices of different sizes and a plurality of valves associated therewith for controlling said pressure actuated valve operating means and temperature responsive means automatically operating a said valve upon a predetermined change in furnace temperature and operating other of said valves upon further changes in furnace temperature whereby said fuel control valve is open an amount corresponding to the operation of said valves associated with said orifices.

HENRY A. DREFFEIN.